(12) United States Patent
Milliere

(10) Patent No.: US 12,454,366 B2
(45) Date of Patent: Oct. 28, 2025

(54) AIRCRAFT HAVING A DIHYDROGEN TRANSPORT PIPE AND A SYSTEM FOR EXTRACTING SAID DIHYDROGEN TO THE OUTSIDE

(71) Applicant: Airbus Operations SAS, Toulouse (FR)

(72) Inventor: Jérôme Milliere, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 40 days.

(21) Appl. No.: 18/627,778

(22) Filed: Apr. 5, 2024

(65) Prior Publication Data
US 2024/0359810 A1    Oct. 31, 2024

(30) Foreign Application Priority Data

Apr. 26, 2023    (FR) ...................................... 2304190

(51) Int. Cl.
*B64D 37/30*    (2006.01)
*B64D 37/20*    (2006.01)
*B64D 37/32*    (2006.01)

(52) U.S. Cl.
CPC ............. *B64D 37/30* (2013.01); *B64D 37/20* (2013.01); *B64D 37/32* (2013.01)

(58) Field of Classification Search
CPC ............................... B64D 27/30; B64D 27/32
See application file for complete search history.

(56) References Cited

U.S. PATENT DOCUMENTS

| 8,973,872 B2 * | 3/2015 | Haug .................. B29D 23/008 |
| | | 244/135 R |
| 2023/0043843 A1 | 2/2023 | Pissavin et al. |
| 2023/0044493 A1 | 2/2023 | Czapla et al. |
| 2023/0086167 A1 | 3/2023 | Milliere et al. |

OTHER PUBLICATIONS

French Search Report for corresponding French Patent Application No. 2304190 dated Oct. 13, 2023.

* cited by examiner

*Primary Examiner* — Nicholas McFall
(74) *Attorney, Agent, or Firm* — Greer, Burns & Crain, Ltd.

(57) ABSTRACT

An aircraft comprising a dihydrogen transport pipe, a pipe shroud around the transport pipe, a dihydrogen tank, a chamber delimiting a fluidtight volume containing a system fluidically connected to the transport pipe which joins the pipe shroud through a chimney, an extraction chamber into which the chimney and the pipe shroud open, and a device for extracting to the outside the gases present in the extraction chamber.

10 Claims, 5 Drawing Sheets

AIRCRAFT HAVING A DIHYDROGEN TRANSPORT PIPE AND A SYSTEM FOR EXTRACTING SAID DIHYDROGEN TO THE OUTSIDE

CROSS-REFERENCES TO RELATED APPLICATIONS

This application claims the benefit of French Patent Application Number 2304190 filed on Apr. 26, 2023, the entire disclosure of which is incorporated herein by way of reference.

FIELD OF THE INVENTION

The present invention relates to the field of aircraft and, in particular, aircraft of which the energy source is liquid or gaseous dihydrogen, whether this is for supplying a fuel cell or for directly supplying the combustion chamber of an engine. The present invention thus relates to an aircraft having a dihydrogen transport pipe and a system for extracting said dihydrogen to the outside if need be.

BACKGROUND OF THE INVENTION

It is known to use dihydrogen as energy source in an aircraft. The dihydrogen is stored in a reservoir and a transport pipe transports the dihydrogen from the reservoir towards the consuming device, such as for example a fuel cell or the combustion chamber of an engine.

In the event of dihydrogen leaking along this transport pipe, and so as to avoid the creation of a flammable mixture around the leak zone, it is necessary to provide dedicated devices.

SUMMARY OF THE INVENTION

An object of the present invention is to propose an aircraft having a dihydrogen transport pipe and an extraction system which discharges the dihydrogen to outside the aircraft in the event of a leak.

To that end, there is proposed an aircraft having:
at least one transport pipe in which dihydrogen flows,
for each transport pipe, a pipe shroud inside which the transport pipe is fixed,
a tank containing dihydrogen,
a chamber comprising lateral walls, a floor and a roof together delimiting a fluidtight volume intended to contain systems for transporting the dihydrogen, in which said at least one transport pipe is fluidically connected to one of said systems, in which said at least one transport pipe joins the corresponding pipe shroud through a chimney in the roof,
an extraction chamber into which the chimney and the or each pipe shroud open, and
extraction means which are arranged to extract to the outside the gases present in said extraction chamber.

With such an arrangement, in the event of dihydrogen leaking into the chamber, the dihydrogen is evacuated to outside the aircraft.

Advantageously, one of the lateral walls has a passage into which one end of the tank is fixed in a fluidtight manner.

Advantageously, the chimney opens into the extraction chamber from the underside of said extraction chamber.

Advantageously, the aircraft comprises a ventilation system arranged to ensure that outside air is introduced into the or each pipe shroud towards the extraction chamber.

Advantageously, each pipe shroud opens into the extraction chamber from the front of said extraction chamber.

Advantageously, the extraction means comprise a venturi-effect system.

Advantageously, the extraction means comprise a discharge pipe which opens to outside the aircraft and which is fluidically connected to the extraction chamber and a fan mounted in the discharge pipe.

Advantageously, the discharge pipe opens into the extraction chamber from the rear of said extraction chamber.

Advantageously, the extraction chamber comprises an outer wall constituting an exterior wall of the aircraft, said outer wall is pierced with an opening, and said outer wall is fitted with a hatch that can be moved alternately between a closed position in which the opening is closed and an open position in which the opening is open.

Advantageously, the aircraft comprises an air inlet duct positioned at the lower part of the chamber and providing communication between the outside of the aircraft and the inside of the chamber.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
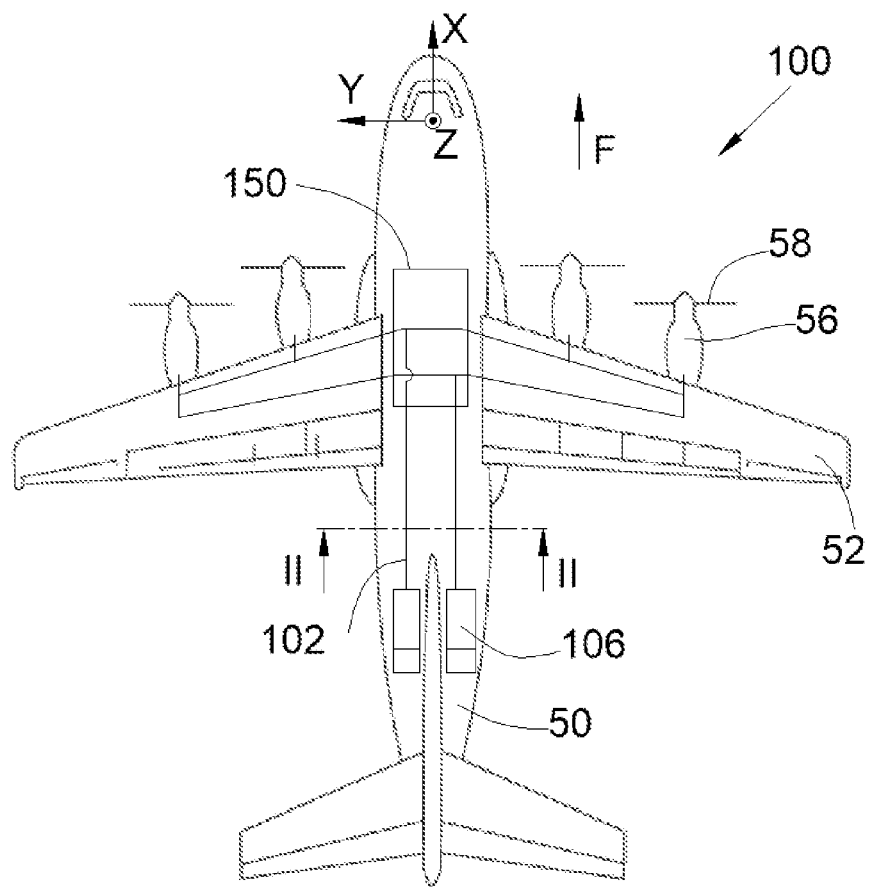
FIG. 1 is a view from above of an aircraft according to the invention.

FIG. 1 shows an aircraft 100 that has a fuselage 50 on each side of which is fixed a wing 52. Beneath each wing 52 is fixed at least one propulsion system 56.

By convention, the X direction is the name given to the longitudinal direction of the aircraft 100, the Y direction is the name given to the transverse direction of the aircraft 100, which direction is horizontal when the aircraft is on the ground, and the Z direction is the name given to the vertical or height direction which is vertical when the aircraft is on the ground, these three directions X, Y and Z being mutually orthogonal.

Moreover, the terms "front" and "rear" should be considered with respect to a direction of forward movement of the aircraft 100 during operation of the propulsion systems 56, this direction being depicted schematically by the arrow F.

In the embodiment of the invention that is presented here, each propulsion system 56 comprises an electric motor, a propeller 58 mounted on the driveshaft of said electric motor and a fuel cell that supplies the motor with electricity.

The fuel cell is supplied with oxygen and dihydrogen in order to produce electricity.

In another embodiment, the propulsion system 56 can take the form of a jet engine of which the fuel that is burnt in the combustion chamber is dihydrogen.

The aircraft 100 also comprises at least one tank 106 which is filled with dihydrogen and in this instance there are two tanks 106, arranged respectively one on the port side and one on the starboard side of the fuselage 50.

The tanks 106 are, in this instance, situated in a rear part of the fuselage 50, but could be situated in another part of the aircraft 100. The dihydrogen may be liquid or gaseous.

In order to transport the dihydrogen, the aircraft 100 comprises at least one transport pipe 102, in which the dihydrogen flows from a tank 106 towards the propulsion system 56 in order to supply a fuel cell or a combustion chamber which constitutes the device that consumes said dihydrogen. For reasons of ease of implementation, the transport pipes 102 are preferentially located in the upper part of the aircraft 100 and thus extend along the fuselage 50 and the wings 52 in the upper part thereof.

Figure 2:
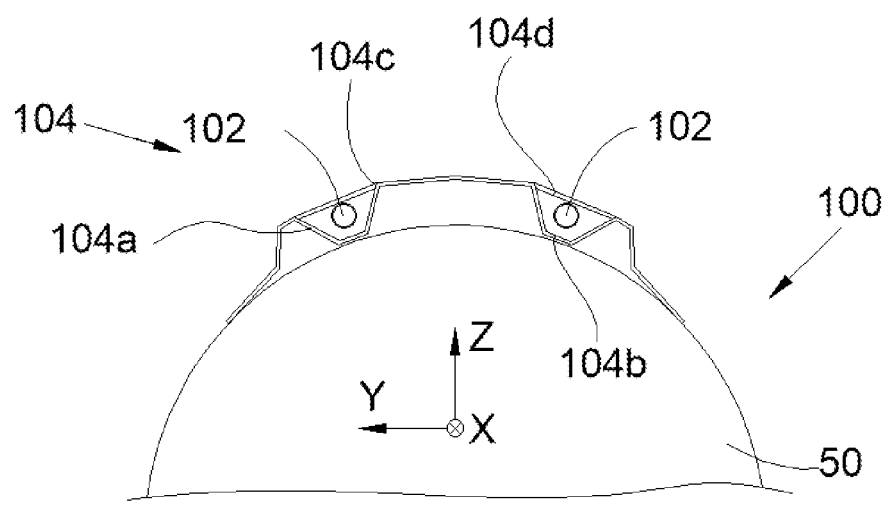
FIG. 2 is a view in cross section of the fuselage of the aircraft in FIG. 1 along the line II-II.

FIG. 2 shows a cross section through the fuselage 50 with two transport pipes 102.

In the embodiment depicted in FIG. 2, each transport pipe 102 is housed and fixed in a pipe shroud 104 which therefore surrounds said transport pipe 102. In the embodiment of the invention that is set out in FIG. 2, the pipe shroud 104 takes the form of a gutter 104a having a bottom 104b, an opening 104c opposite the bottom 104b and a cover 104d that covers the opening 104c of the gutter 104a, closing it off. The transport pipe 102 is fixed to the pipe shroud 104 by any appropriate means such as for example collars.

In the embodiment of the invention that is presented in FIG. 2, the gutter 104a has a trapezoidal cross section, but cross sections having a different shape are possible.

Figure 3:
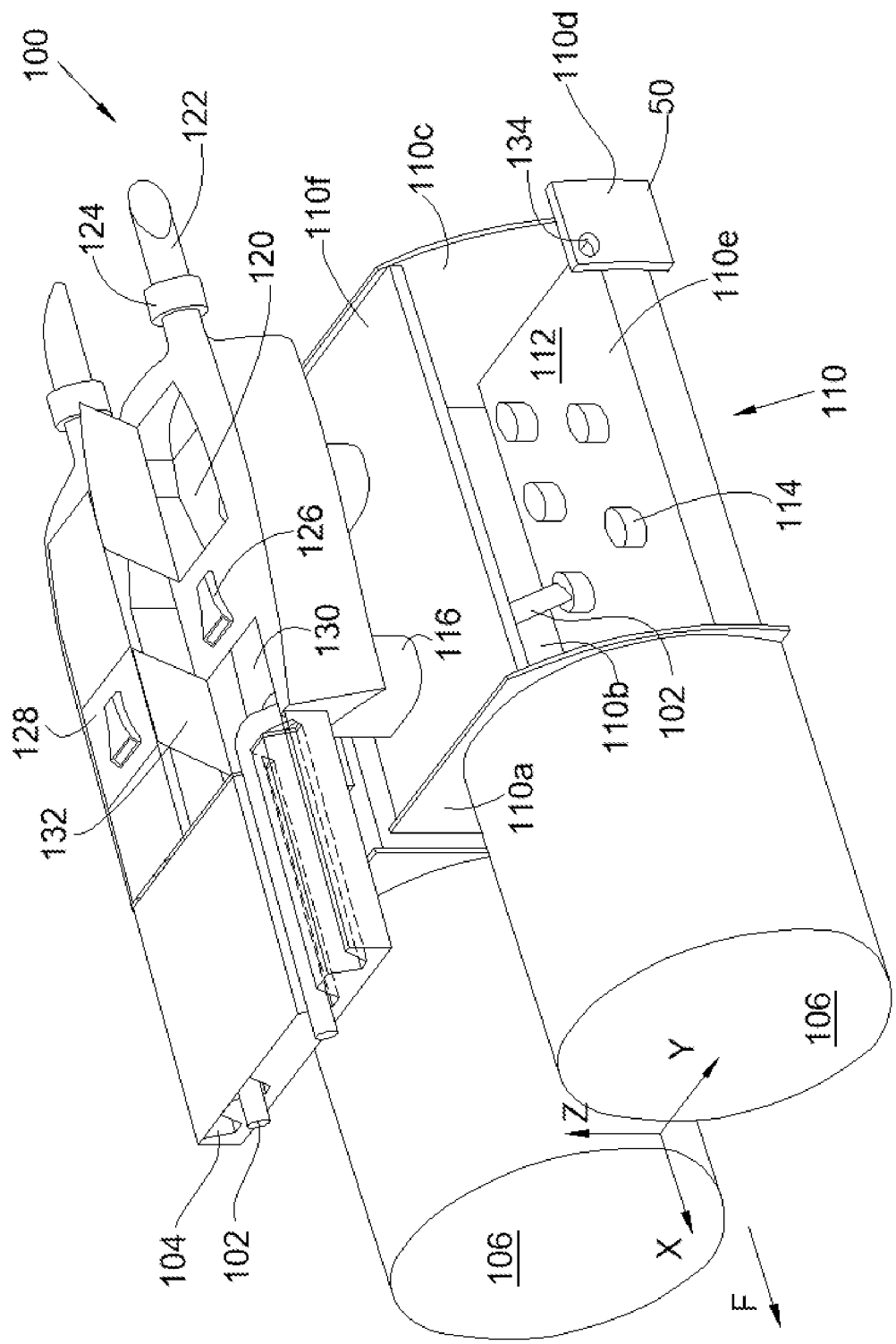
FIG. 3 is a perspective view of the part of the aircraft that comprises a dihydrogen tank.
Figure 4:
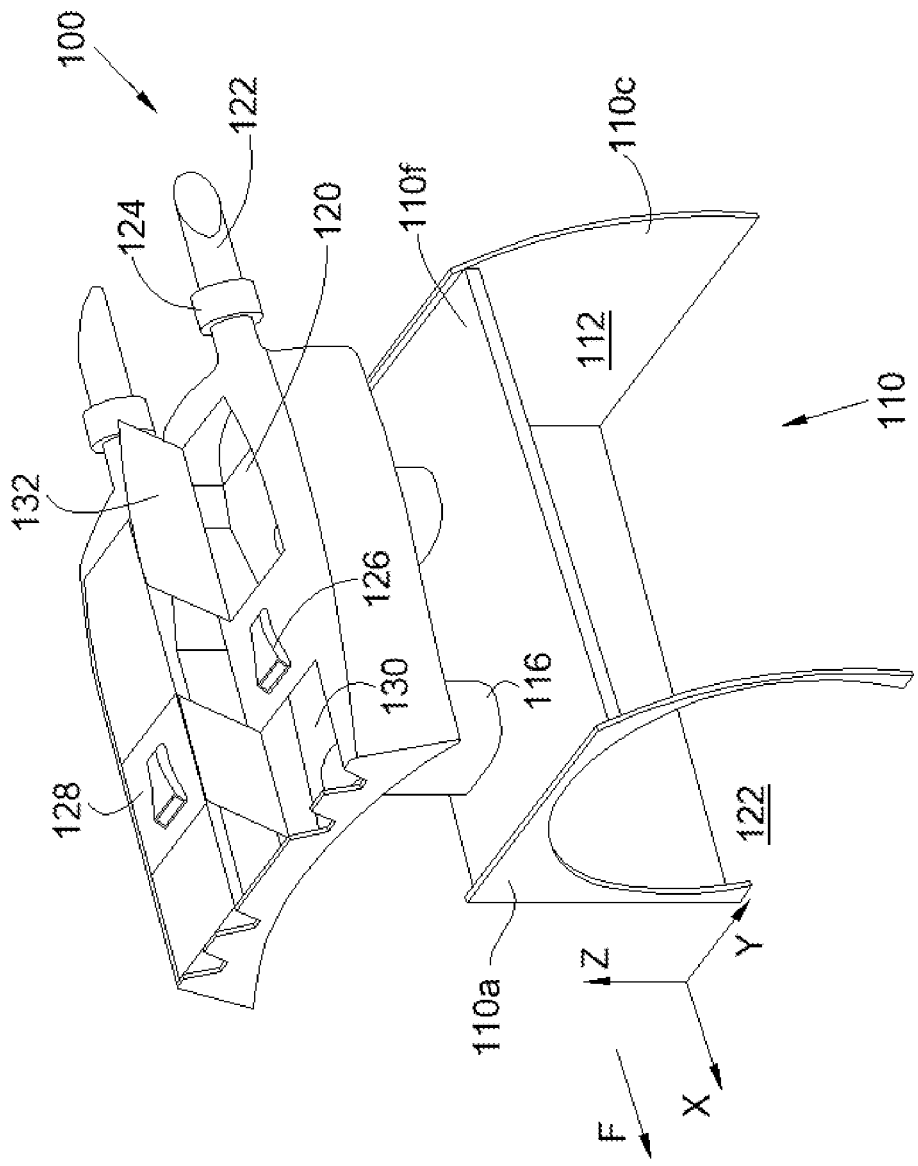
FIG. 4 shows the same view as that of FIG. 3 but without the dihydrogen tank.
Figure 5:
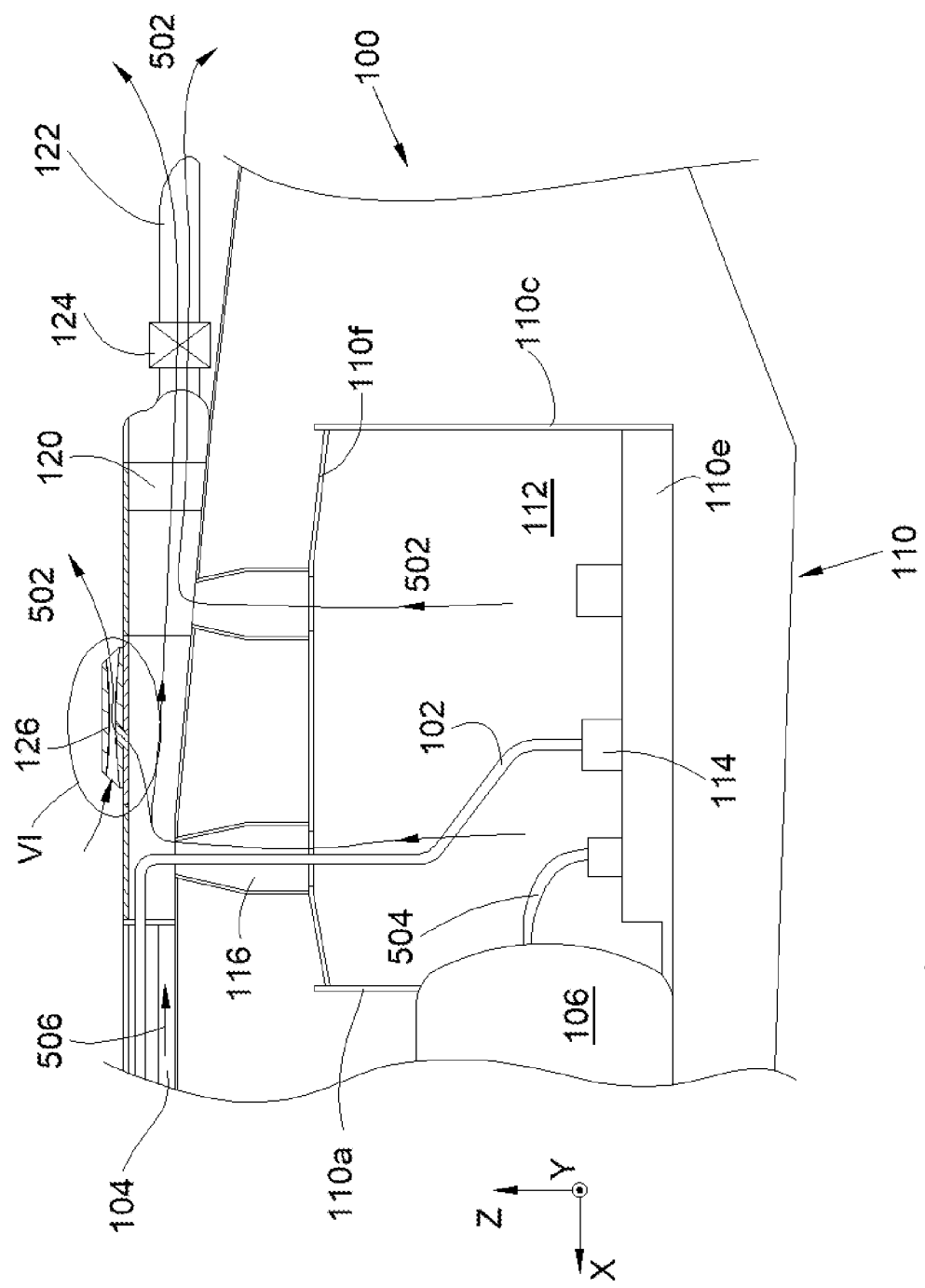
FIG. 5 is a view, in section on a vertical plane, of the part of the aircraft that comprises a dihydrogen tank.

FIGS. 3 to 5 show that part of the aircraft 100 at which the tanks 106 are located. In FIG. 3, part of the cover 104d has been removed in order to reveal the transport pipe 102 in the pipe shroud 104.

The aircraft 100 thus comprises, for each tank 106, a chamber 110 comprising lateral walls 110a-d, in this instance four of them, each extending roughly vertically, a floor 110e and a roof 110f. The lateral walls 110a-d, the floor 110e and the roof 110f together delimit a fluidtight volume 112. The joints between the lateral walls 110a-d, the floor 110e and the roof 110f are fluidtight to prevent any dihydrogen originating from a leak into the chamber 110 from spreading through the aircraft 100.

Systems 114 are arranged in the chamber 110 and these systems 114 are intended for transporting the dihydrogen from the tank 106 to the transport pipe 102. These systems 114 are, for example, distribution piping leading to pumps, heaters, etc. which handle the dihydrogen and are, for example, located in an a nearby dedicated compartment.

Each transport pipe 102 is fluidically connected to one of the systems 114 such as, for example, distribution piping fluidically connected to a pump and, for this purpose, the roof 110f is equipped with a chimney 116 through which the transport pipe 102 joins the pipe shroud 104.

The number of chimneys 116 may vary for example according to the number of pipes to pass through. In the embodiment of the invention shown here, there are two chimneys 116.

Above the roof 110f and above each chimney 116, the aircraft 100 comprises an extraction chamber 120 delimited by walls. The chimney 116 and each pipe shroud 104 corresponding to a transport pipe 102 passing through the chimney 116 open into the extraction chamber 120, in this instance via orifices in the walls of said extraction chamber 120.

Thus, in the embodiment of the invention presented in FIGS. 3 to 5, the or each chimney 116 opens into the extraction chamber 120 via the underside of said extraction chamber 120.

Each transport pipe 102 thus passes through the chamber 110 and the extraction chamber 120.

Each chimney 116 is fluidtight insofar as it does not allow the gas to escape towards the inside of the aircraft 100, but is not fluidtight insofar as it guides the gas between the chamber 110 and the extraction chamber 120.

The aircraft 100 also comprises extraction means which are designed to extract to outside the aircraft 100 the gases (air, dihydrogen) present in the extraction chamber 120 so as to limit the dihydrogen concentration.

Thus, as shown in FIG. 5, if dihydrogen is present in the chamber 110, for example as a result of a leak from a pipe present in the chamber 110 or a leak from the system 114, the extraction system draws out gases present in the extraction chamber 120 and, therefore, in the chamber 110, by drawing them up through the chimneys 116 to discharge them to outside the aircraft 100. For this purpose, the arrows 502 show the path of the gases from the chamber 110 to the outside.

In the embodiment of the invention shown in FIG. 3, one of the lateral walls 110d consists of the skin of the fuselage 50.

As shown in FIGS. 4 and 5, one of the walls of the chamber 110, in this instance the lateral wall 110a which faces towards the front of the aircraft 100 has a passage 121 into which one end of the tank 106 is fixed in a fluidtight manner. Such an arrangement allows the pipe 504 leading from the tank 106 toward such system 114 to be located inside the chamber 110. The pipe 504 is fluidically connected to the transport pipe 102 through the systems 114 and therefore constitutes part thereof.

In the embodiment of the invention shown in FIG. 1, the aircraft 100 comprises a ventilation system 150 which in this instance is positioned in the upper part of the aircraft 100 at the junction of the wings 52 and that makes it possible to introduce external air and to send this air in each pipe shroud 104 towards the extraction chamber 120. Thus, as the aircraft 100 moves forward, outside air rushes into each pipe shroud 104 to reach the rear of the pipe shroud 104 which in this instance is the part that opens into the extraction chamber 120. Thus, any dihydrogen that might be present in the pipe shroud 104 is pushed back towards the extraction chamber 120 (arrow 156) where it is discharged to outside the aircraft 100 by the extraction means.

The ventilation system 150 for example takes the form of a ventilation opening designed to capture air from outside the aircraft 100 and positioned for example on the outer skin of the aircraft 100 and which is therefore open between the outside of the aircraft 100 and each pipe shroud 104.

Because of the fact that the ventilation system 150 is positioned at the front of the aircraft 100 and in order to ensure a good flow of air along each pipe shroud 104, the extraction chamber 120 is at the rear of the ventilation system 150 and, in this instance, at the rear of the aircraft 100, and the or each pipe shroud 104 opens into the extraction chamber 120 via the front of said extraction chamber 120.

Figure 6:
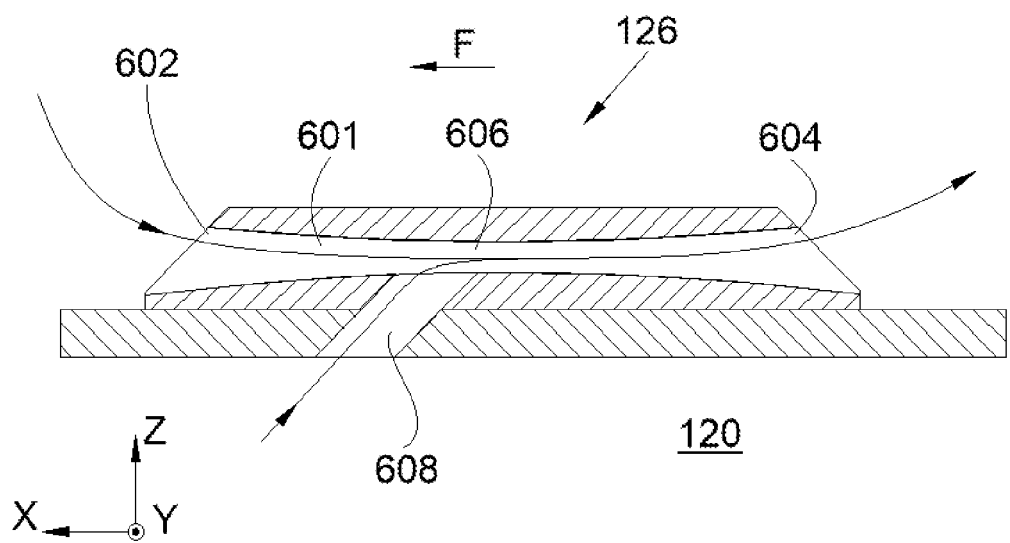
FIG. 6 is an enlarged view of detail VI of FIG. 5.

In the embodiment of the invention depicted in FIGS. 3 to 5, the extraction means comprise a venturi-effect system 126, one embodiment of which is depicted in FIG. 6.

The venturi-effect system 106 comprises a sheath 601 with an inlet 602 and an outlet 604 and is fixed on the outside of the aircraft 100 in the outside air flow with the inlet 602 directed towards the front and the outlet directed towards the rear.

The sheath 601 has a cross section that decreases between the inlet 602 and an intermediate point 606 somewhere between the inlet 602 and the outlet 604 and which then increases between the intermediate point 606 and the outlet 604.

The venturi-effect system 126 comprises a transfer pipe 600 which is fluidically connected between the extraction chamber 120 and the sheath 601 and more particularly connected at the intermediate point 606.

Thus, the outside air flow passing along the sheath 601 accelerates between the inlet 602 and the outlet 604 and draws the gases present in the extraction chamber 120 along the transfer pipe 608.

In the embodiment of the invention that is presented here, the venturi-effect system 126 is installed on the roof of the extraction chamber 120.

In addition or as an alternative, the extraction means comprise a discharge pipe 122 which has a first end that opens to outside the aircraft 100 and a second end that is fluidically connected to the extraction chamber 120 and a fan 124 mounted in the discharge pipe 122. Thus, even when the aircraft 100 is motionless, the gases present in the extraction chamber 120 are extracted by the fan 124.

According to one preferred embodiment, the discharge pipe 122 opens into the extraction chamber 120 from the rear of said extraction chamber 120. Such an arrangement makes it possible for example to benefit from the presence of the ventilation system 150 and therefore from the flow from the ventilation system 150, particularly when the or each pipe shroud 104 opens into the extraction chamber 120 via the front of said extraction chamber 120.

In the embodiment of the invention that is presented in FIGS. 3 and 4, the extraction chamber 120 comprises an outer wall 128, in this instance its roof, and this outer wall 128 is an exterior wall of the aircraft 100, namely a wall in contact with the outside.

For the purposes of gaining access to the inside of the extraction chamber 120, the outer wall 128 is pierced with an opening 130 and is fitted with a hatch 132 that can be moved alternately between a closed position in which the opening 130 is closed and an open position in which the opening 130 is open. The hatch 132 is mounted for example on hinges and is locked in the closed position by a latch.

According to one particular embodiment, and in order to avoid the chamber 110 being placed under vacuum as a result of excessive suction, an air inlet duct 134 is located in the lower part of the chamber 110 and provides communication between the outside of the aircraft 100 and the inside of the chamber 110, in this instance through the lateral wall 110d that forms the skin of the fuselage 50.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft having:
   at least one transport pipe in which dihydrogen flows, for each transport pipe a pipe shroud inside which the transport pipe is fixed,
   a tank containing dihydrogen,
   a chamber comprising lateral walls, a floor and a roof together delimiting a fluidtight volume configured to contain one or more systems for transporting the dihydrogen, wherein the at least one transport pipe is fluidically connected to one of said one or more systems, wherein the at least one transport pipe joins the respective pipe shroud through a chimney in the roof,
   an extraction chamber into which the chimney and each pipe shroud open, and
   extraction means configured to extract gases present in said extraction chamber.

2. The aircraft according to claim 1, wherein one of the lateral walls has a passage into which an end of the tank is fixed in a fluidtight manner.

3. The aircraft according to claim 1, wherein the chimney opens into the extraction chamber from an underside of said extraction chamber.

4. The aircraft according to claim 1, further comprising:
   a ventilation system arranged to ensure that outside air is introduced into each pipe shroud towards said extraction chamber.

5. The aircraft according to claim 4, wherein each pipe shroud opens into the extraction chamber from a front of said extraction chamber.

6. The aircraft according to claim 4, wherein the extraction means comprise a venturi-effect system.

7. The aircraft according to claim 4, wherein the extraction means comprise a discharge pipe which opens to outside the aircraft and which is fluidically connected to the extraction chamber and a fan mounted in the discharge pipe.

8. The aircraft according to claim 7, wherein the discharge pipe opens into the extraction chamber from a rear of said extraction chamber.

9. The aircraft according to claim 1, wherein the extraction chamber comprises an outer wall constituting an exterior wall of the aircraft, wherein said outer wall is pierced with an opening, and wherein said outer wall is fitted with a hatch configured to be moved alternately between a closed position in which the opening is closed and an open position in which the opening is open.

10. The aircraft according to claim 1, further comprising:
    an air inlet duct positioned at a lower part of the chamber and providing communication between the outside of the aircraft and the inside of the chamber.

* * * * *